(12) United States Patent
Muehlmann

(10) Patent No.: US 8,939,370 B2
(45) Date of Patent: Jan. 27, 2015

(54) PROGRAMMABLE CAMERA, PROGRAMMING DEVICE, PROGRAMMABLE CAMERA SYSTEM, AND METHOD FOR PROGRAMMING

(75) Inventor: Karsten Muehlmann, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 291 days.

(21) Appl. No.: 13/541,622

(22) Filed: Jul. 3, 2012

(65) Prior Publication Data

US 2013/0015237 A1 Jan. 17, 2013

(30) Foreign Application Priority Data

Jul. 14, 2011 (DE) .......................... 10 2011 079 141

(51) Int. Cl.
*G06K 19/00* (2006.01)
*H04N 5/232* (2006.01)

(52) U.S. Cl.
CPC ................................. *H04N 5/23225* (2013.01)
USPC ....... 235/454; 235/435; 235/439; 235/462.01

(58) Field of Classification Search
USPC .................................. 235/375, 435, 439, 454
See application file for complete search history.

(56) References Cited

U.S. PATENT DOCUMENTS

2008/0231716 A1* 9/2008 Anderson .................. 348/211.3
2011/0101086 A1* 5/2011 Yach ............................. 235/375

FOREIGN PATENT DOCUMENTS

DE    10 2006 027 121    12/2007
WO    WO 2010/123332     10/2010

* cited by examiner

*Primary Examiner* — Matthew Mikels
(74) *Attorney, Agent, or Firm* — Kenyon & Kenyon LLP

(57) ABSTRACT

A programmable camera includes a camera control device, an optical sensor, a volatile data memory, a flash memory, and an interface to a data bus, e.g., a CAN bus. The camera is configured to optically receive and read in program data in a programming mode with the aid of an optical code, e.g., a barcode, and to program the flash memory using the received program data.

17 Claims, 3 Drawing Sheets

PROGRAMMABLE CAMERA, PROGRAMMING DEVICE, PROGRAMMABLE CAMERA SYSTEM, AND METHOD FOR PROGRAMMING

BACKGROUND OF THE INVENTION

1. Field of the Invention

The present invention relates to a programmable camera, a programming device, a programmable camera system, and a method for programming.

2. Description of the Related Art

Cameras in automobiles are known, for example, for driver assistance such as for lane recognition systems or traffic sign recognition, and for recognizing obstructions.

Published German patent application document DE 10 2006 027 121 A1 describes an image recording system and a method for distance determination using a vehicle-mounted camera. Such cameras are usually connected to devices in the vehicle in order to exchange data via a CAN bus. The camera typically has a camera control device which controls the camera and performs image processing. The camera control device has a flash memory as program memory. The camera control device may also be programmed via the CAN bus, although the CAN bus has a low data rate, so that programming or loading of the control program may take a long time.

Barcodes are one frequently used option for reading useful data into a mobile device. Published international patent application document WO 2010/123332 discloses, for example, data communication using a two-dimensional barcode. With the aid of such barcodes, data concerning objects are read into a mobile device for the purpose of data collection.

BRIEF SUMMARY OF THE INVENTION

According to the present invention, program data for programming the camera control device are transmitted optically with the aid of two-dimensional barcodes, not via a data bus. The authorization and logging of the transmission of the program data are carried out via the data bus.

The present invention allows more rapid transmission of fairly large data volumes into a camera control unit via an optical path.

The camera is preferably addressable via only one data bus, in particular the CAN bus, and has a large flash memory component, typically 16-32 Mbytes. The camera may be programmed at a higher bandwidth via the optical path than via the CAN bus. The flash programming operation, which via a CAN bus usually takes an hour or even much longer, may thus be significantly shortened. This is advantageous for the production as well as for the service of automobiles.

DETAILED DESCRIPTION OF THE INVENTION

Figure 1:
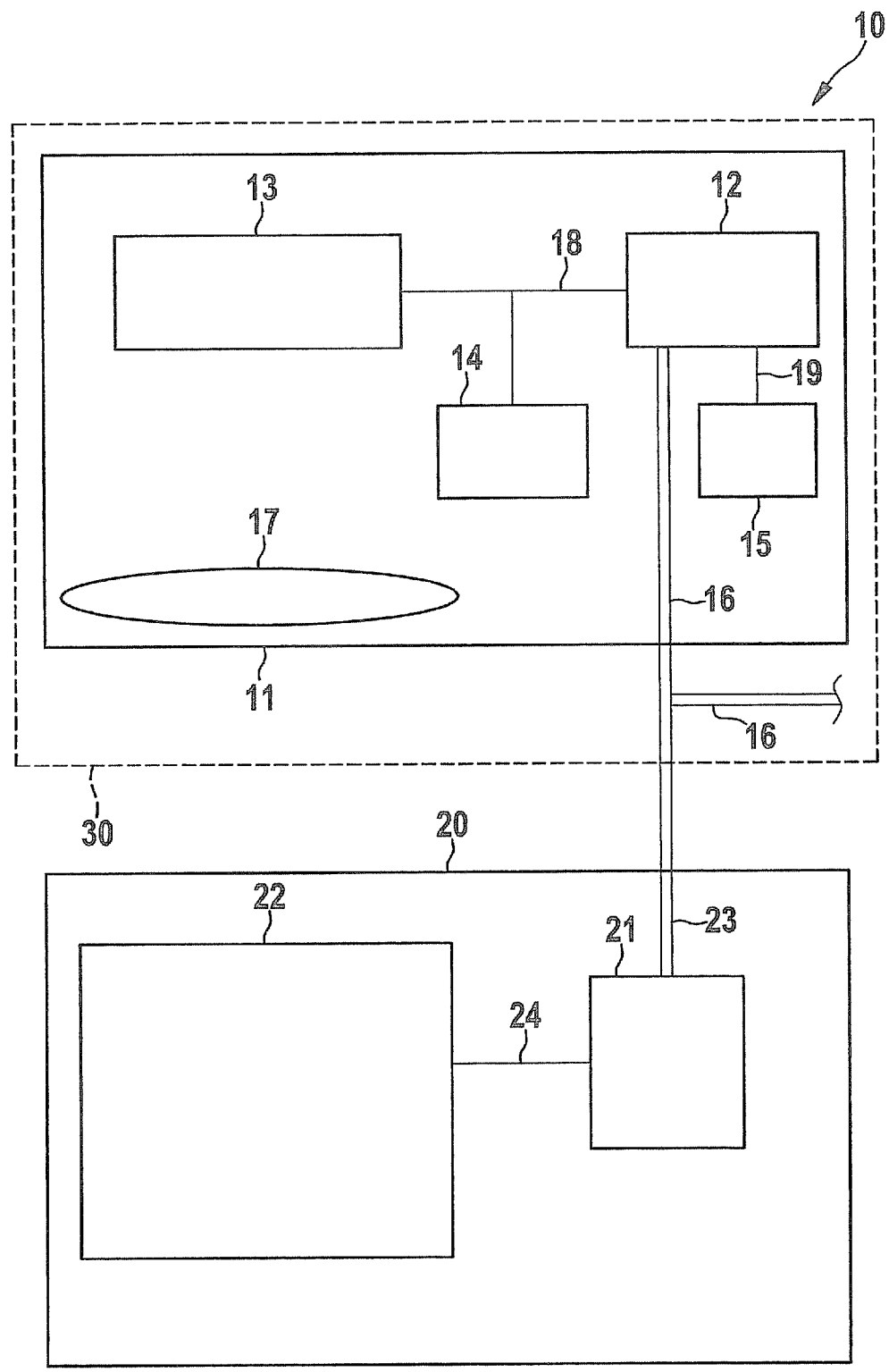
FIG. 1 shows a schematic illustration of the programmable camera system, including a camera and a programming device according to one specific embodiment of the present invention.

FIG. 1 shows a schematic illustration of the programmable camera system, including a camera and a programming device according to one specific embodiment of the present invention.

A camera 11 has a camera control device 12, an optical sensor 13, a volatile data memory 14, a flash memory 15, and an interface to a data bus, in the present case a CAN bus 16. Camera 11 also has a lens 17 for imaging an external object on optical sensor 13. Camera control device 12, optical sensor 13, and volatile data memory 14 are connected to one another via an image data bus 18. Camera control device 12 and flash memory 15 are connected to one another via a program data bus 19.

Camera 11 and CAN bus 16 are part of an indicated automobile 30.

Camera 11 is designed to collect image data with the aid of sensor 13, to store the image data in data memory 14 via image data bus 18, and to process the image data with the aid of camera control device 12. Camera control device 12 obtains its control program from flash memory 15 via program data bus 19.

To prepare for normal operation, camera control device 12 loads program data from flash memory 15. During normal operation, camera 11 collects images of a traffic situation, which are stored as image data in data memory 14 and evaluated by camera control device 12. The evaluated traffic situation is transmitted, in the form of a data volume which is greatly reduced compared to the image data volume, to other devices in automobile 30 via CAN bus 16.

Camera control device 12 is to be understood as part of camera 11, even if camera control device 12 is situated spatially separate from image sensor 13.

Camera control device 12 of camera 11 may be programmed in a programming mode; i.e., in this mode, program data may be externally loaded and written into flash memory 15. This is carried out with the aid of an external programming device 20.

Programming device 20 for programming camera control device 12 has a control unit 21, a display 22, and an interface to a CAN bus 23. Control unit 21 and display 22 are connected to one another via an image data bus 24. Display 22 is a high-resolution monitor.

In FIG. 1, programmable camera system 10 is shown in the state in which programming of camera control device 12 takes place. For this purpose, on the one hand lens 17 of camera 11 is directed toward display 22 of programming device 20, and on the other hand, CAN bus 23 is connected to CAN bus 16 of automobile 30, for example via a diagnostics/maintenance system connector.

Programming device 20 is designed to optically display program data for camera 11 on display 22 with the aid of the two-dimensional barcode. In addition, programming device 20 is designed to communicate with camera control device 12 via CAN bus 16.

This communication via CAN bus 16 includes the initiation of the programming mode of camera control device 12 via programming device 20 with the aid of the programming mode signals, and the logging of the transmission of program data for camera 11, i.e., transmission of an acknowledgment of the receipt of the program data from camera control device 12 to programming device 20. The program data are represented on display 22 as two-dimensional barcodes and optically transmitted to camera 11.

For the programming, camera 11 and camera control device 12 are designed to optically receive and read in program data via lens 17 and image sensor 13, with the aid of a barcode, to acknowledge the receipt of the program data via the CAN bus, and to program flash memory 15 using the program data.

Camera 11 is programmed by playing back variable two-dimensional barcodes on display 22 of programming device 20. In this example, camera 11 records 1024×512 pixels in 4096 grayscales at 30 images/s. The camera is thus able to record high-resolution two-dimensional codes such as QR codes, Aztec codes, or data matrix codes containing several kB of useful data per image. Reliable transmission with flow control is achieved by using the CAN bus as a reverse channel for the acknowledgment.

Figure 2:
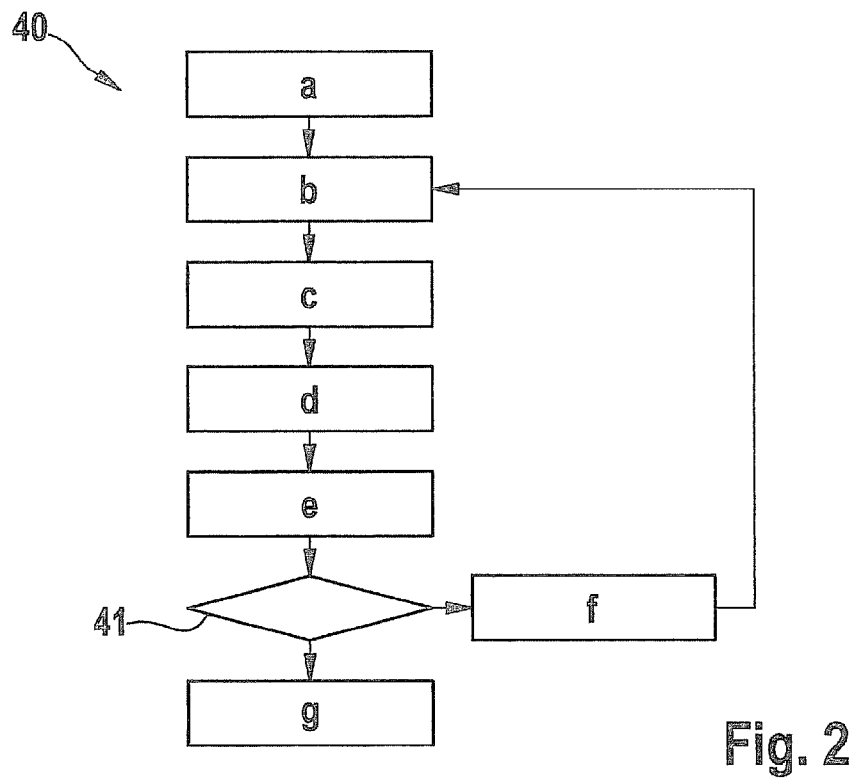
FIG. 2 shows a flow chart of a general programming method according to another specific embodiment of the present invention.

FIG. 2 shows a flow chart 40 of a general programming method according to another specific embodiment of the present invention. The method is explained as an example, with reference to programmable camera system 10 from FIG. 1.

The method begins with the entry into a programming mode in method step a). For this purpose, programming device 20 transmits a programming mode signal to camera control device 12 via CAN bus 16, whereupon the camera control device enters into programming mode and optionally sends an acknowledgment thereof via CAN bus 16.

In method step b), camera control device 12 now begins to display all program data on display 22 in a two-dimensional barcode screen page by screen page. These data displayed on display 22 are received by camera sensor 13 and read in as received data in method step c).

The received data are checked for correctness in method step d). The receipt together with the check result is acknowledged via CAN data bus 16 in method step e).

A branch 41 now occurs, depending on the check result. In the case of incorrect or incomplete program data, the incorrect data are retransmitted, or the missing data are transmitted for the first time with the aid of method steps b) through e), and checked in branch f). If the received data are correct and complete, i.e., the received data are identical to the transmitted program data, the method continues with method step g), and camera control device 12 is programmed using the received data.

Following this general description of the method, two special transmission schemes are now explained in greater detail.

Figure 3:
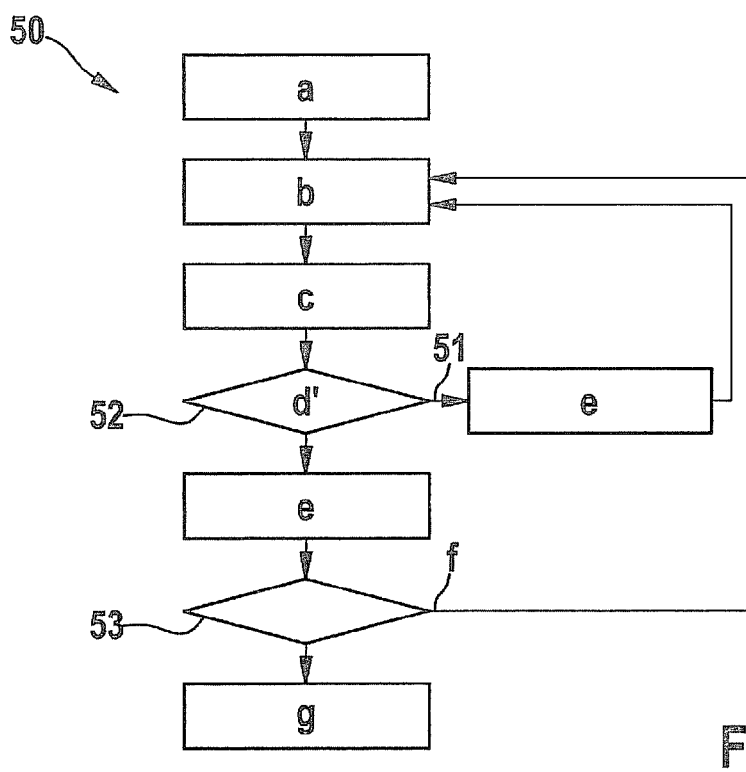
FIG. 3 shows a flow chart of a programming method according to another specific embodiment of the present invention, having a first transmission scheme.

FIG. 3 shows a flow chart 50 of a programming method according to another specific embodiment of the present invention, having a first transmission scheme.

In the first transmission scheme, after being displayed on display 22 in step b) and received in step c), each image and each page is checked for correctness in d'). In the present case, method step d) from FIG. 2 is illustrated as method step d') having a branch.

In the case of an incorrectly received image, the method branches to branch 51, and the check result in e) is transmitted to camera control device 12. If the check result indicates an incorrectly received image, camera control device 12 prompts the incorrectly received image to be redisplayed.

In the case of a correctly received image, the method branches to branch 52, and the check result in e) is transmitted to camera control device 12. The correctly received program data are now checked for completeness in query 53. In the event that data are still missing, the method branches to branch f), and camera control device 12 prompts a new image to be displayed, and the method continues in method step b).

If the program data are complete in query 53, the complete, correctly received program data are written into flash memory 15 in method step g).

According to one modified specific embodiment, the program data are transmitted and programmed by sectors. In case of error, the entire faulty sector is overwritten. In this specific embodiment, a flow chart would be similar to flow chart 50, except that method step g) would take place between method steps e) and f).

Figure 4:
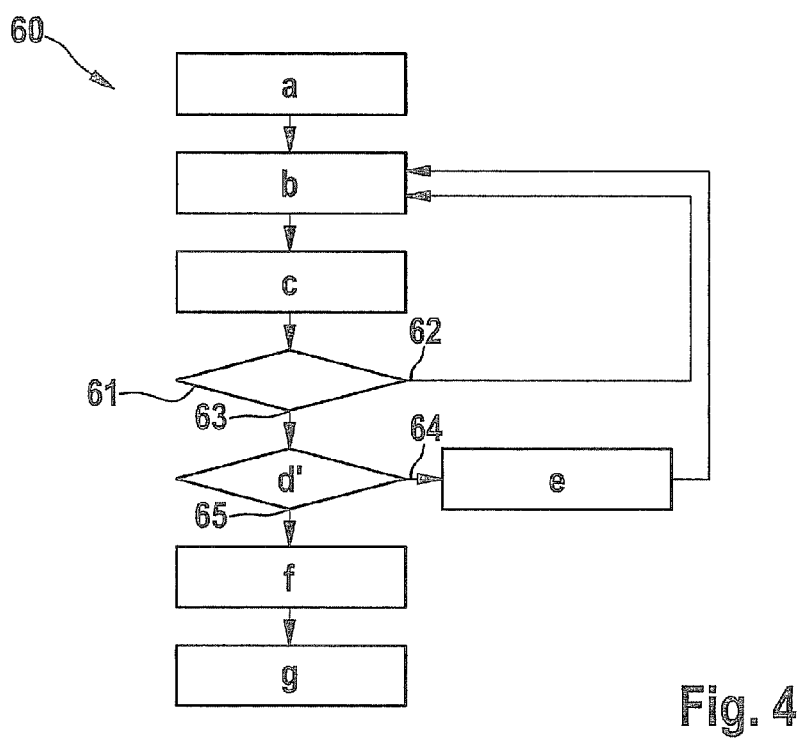
FIG. 4 shows a flow chart of a programming method according to another specific embodiment of the present invention, having a second transmission scheme.

FIG. 4 shows a flow chart 60 of a programming method according to another specific embodiment of the present invention, having a second transmission scheme.

In the second transmission scheme, programming device 20 does not wait for confirmation of an individual transmitted image, but, rather, asynchronously receives a list of data blocks which must be retransmitted.

For this purpose, after an image is displayed on display 22 in step b) and received in step c), a check is made for completeness of program data in branch 61. In this example, if the program data are incomplete, the missing data are initially sent by branching to branch 62, and method steps b) and c) are repeated. The method then branches to branch 63, and the data are checked for correctness in step d'). In the present case, method step d) from FIG. 2 is illustrated as method step d') having a branch.

In the case of incorrectly received data, the method branches to branch 64, and the check result in e) together with the identification of incorrect data blocks is transmitted to camera control device 12. The incorrect data blocks are retransmitted by continuing the method in step b). If all data have been correctly received, the method branches to branch 65 and the correctness is acknowledged in method step e). Lastly, the complete, correctly received program data are written into flash memory 15 in method step g). The programming of camera control device 12, i.e., camera 11, is thus concluded.

According to one modified specific embodiment, the program data are transmitted and programmed by sectors. In case of error, the entire faulty sector is overwritten. In this specific embodiment, a flow chart would be similar to flow chart 60, except that method step g) would take place between method steps d') and f).

In another alternative specific embodiment, not only are black/white codes used, but also grayscales or color values are used to transmit multiple bits per pixel. This increases the quantity of data that is transmittable per image.

In yet another specific embodiment, at the start of the transmission the optimal parameters are determined; i.e., the resolution and optionally the number of grayscales or color values are dynamically adapted to the circumstances such as light, distance from the camera, etc. For this purpose, test patterns are transmitted on the optical path, and a data channel is negotiated on the data bus with the aid of log data. The channel capacity which is optimal under the given conditions, i.e., an optimized data channel, may thus be achieved. To increase the robustness, the numerous known channel coding methods are used to create redundancy; the QR code defines, for example, error correction rates between 7% and 30%.

What is claimed is:

1. A programmable camera for a vehicle, comprising:
a camera control device;
an optical sensor;
a volatile data memory;
a flash program memory; and
an interface to a data bus;
wherein the camera is configured to:

optically receive program data presented as a plurality of sequential images via the image sensor in a programming mode;

store the received program data in the volatile data memory;

write a control program into the flash program memory using the received program data; and execute the written control program, by the camera control device, to control operation of the programmable camera.

2. The programmable camera as recited in claim 1, wherein the camera is configured to receive, via the data bus, a programming mode signal from a source external to the camera, and assume the programming mode in response to the received programming mode signal.

3. The programmable camera as recited in claim 2, wherein the camera is configured to send an acknowledgement signal via the data bus to the source external to the camera to indicate the receipt of the program data in the programming mode.

4. The programmable camera as recited in claim 1, wherein the camera is configured to check each of the plurality of optically received images for correctness.

5. The programmable camera as recited in claim 1, wherein the camera is configured to check the optically received program data for completeness.

6. The programmable camera as recited in claim 1, wherein the data bus is external to the programmable camera and the interface is a wired interface to the data bus.

7. The programmable camera as recited in claim 6, wherein the camera is configured to send at least one acknowledgement signal via the wired interface to a source of the sequential images external to the camera during the receipt of the images.

8. The programmable camera as recited in claim 7, wherein the camera is configured to check each of the plurality of optically received images for correctness, and the at least one acknowledgement signal indicates the result of the check for correctness.

9. The programmable camera as recited in claim 7, wherein the camera is configured to send the at least one acknowledgement signal via the wired interface to the external data bus to the source external to the camera in response to the receipt of each of the plurality of sequential images.

10. The programmable camera as recited in claim 6, wherein the camera is configured to receive, via the wired interface to the external data bus, a programming mode signal from a source external to the camera, and assume the programming mode in response to the received programming mode signal.

11. The programmable camera as recited in claim 4, wherein the check result indicates an incorrectly received image, and the camera is configured to optically receive the incorrectly received image again.

12. The programmable camera as recited in claim 4, wherein the check result indicates a correctly received image, and the camera is configured to optically receive the next image in the plurality of sequential images.

13. The programmable camera as recited in claim 1, wherein the program data is presented in the plurality of sequential images as two-dimensional bar codes.

14. The programmable camera as recited in claim 1, wherein the program data is presented using grayscales or color values to represent multiple bits per pixel.

15. The programmable camera as recited in claim 1, wherein the camera is configured to optimize an optical channel before optically receiving the program data, including selecting at least one of a resolution, number of greyscale or number of color values to be used in of the plurality of sequential images.

16. The programmable camera as recited in claim 15, wherein:
  the data bus is external to the programmable camera and the interface is a wired interface to the data bus;
  the camera is configured to send at least one acknowledgement signal via the wired interface to a source of the sequential images external to the camera during the receipt of the images; and
  the optimizing includes negotiations between the camera and the source external to the camera.

17. The programmable camera as recited in claim 1, wherein the camera is configured to write the control program into the flash program memory in increments of a memory sector at a time.

* * * * *